United States Patent
Anderson et al.

(10) Patent No.: US 10,855,698 B2
(45) Date of Patent: Dec. 1, 2020

(54) LEVERAGING ENDPOINT AND NETWORK ENVIRONMENT INFERENCES FOR MALWARE TRAFFIC CLASSIFICATION

(71) Applicant: Cisco Technology, Inc., San Jose, CA (US)

(72) Inventors: Blake Harrell Anderson, San Jose, CA (US); Martin Rehak, Prague (CZ); David McGrew, Poolesville, MD (US); Martin Vejman, Litomysl (CZ); Tomas Pevny, Prague (CZ); Martin Grill, Prague (CZ); Jan Kohout, Roudnice Nad Labem (CZ)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 15/851,918

(22) Filed: Dec. 22, 2017

(65) Prior Publication Data

US 2019/0199739 A1    Jun. 27, 2019

(51) Int. Cl.
| | |
|---|---|
| *H04L 29/06* | (2006.01) |
| *G06F 21/53* | (2013.01) |
| *G06N 20/00* | (2019.01) |
| *H04L 12/24* | (2006.01) |

(Continued)

(52) U.S. Cl.
CPC .......... *H04L 63/1416* (2013.01); *G06F 21/53* (2013.01); *G06N 20/00* (2019.01); *H04L 41/145* (2013.01); *H04L 63/0428* (2013.01); *H04L 63/1425* (2013.01); *H04L 63/1458* (2013.01); *G06F 21/6245* (2013.01); *H04L 63/166* (2013.01); *H04L 67/02* (2013.01); *H04L 67/28* (2013.01); *H04L 69/325* (2013.01)

(58) Field of Classification Search
CPC ............ H04L 63/1416; H04L 63/0428; H04L 63/1425; H04L 63/1458; H04L 63/166; H04L 67/02; H04L 67/28; H04L 69/325; G06N 20/00; G06F 21/53; G06F 21/6245
See application file for complete search history.

(56) References Cited

U.S. PATENT DOCUMENTS

| | | | |
|---|---|---|---|
| 9,021,589 | B2 | 4/2015 | Anderson et al. |
| 9,489,514 | B2 | 11/2016 | Mankin et al. |
| 9,769,189 | B2 | 9/2017 | Mohaisen et al. |

(Continued)

OTHER PUBLICATIONS

International Search Report dated Apr. 2, 2019 in connection with PCT/US2018/064688.

(Continued)

*Primary Examiner* — Shin-Hon Eric Chen
*Assistant Examiner* — Jessica J South
(74) *Attorney, Agent, or Firm* — Behmke Innovation Group LLC; Kenneth J. Heywood; Jonathon P. Western

(57) ABSTRACT

In one embodiment, a device obtains simulation environment data regarding traffic generated within a simulation environment in which malware is executed. The device trains a malware detector using the simulation environment data. The device obtains deployment environment characteristics of a network to which the malware detector is to be deployed. The device configures the malware detector to ignore data in the simulation environment data that is associated with one or more environment characteristics that are not present in the deployment environment characteristics.

20 Claims, 7 Drawing Sheets

(51) Int. Cl.
*H04L 29/08* (2006.01)
*G06F 21/62* (2013.01)

(56) References Cited

U.S. PATENT DOCUMENTS

| | | | |
|---|---|---|---|
| 10,320,813 B1* | 6/2019 | Ahmed | H04L 63/1416 |
| 2015/0295943 A1* | 10/2015 | Malachi | H04L 63/1425 726/24 |
| 2016/0275289 A1* | 9/2016 | Sethumadhavan | G06F 21/552 |
| 2017/0134404 A1 | 5/2017 | Machlica et al. | |

OTHER PUBLICATIONS

Anderson, Blake et al.: "Deciphering Malware's Use of TLS (without Decryption)", ARXIV.Org, Cornell University Library, 201 Olin Library, Cornell University, Ithaca, NY 14853, Jul. 6, 2016, pp. 1-4, 6, and 8-9.

Bailey et al., "Automated classification and analysis of internet malware", RAID'07 Proceedings of the 10th international conference on Recent advances in intrusion detection, 2007, 20 pages, Springer-Verlag.

\* cited by examiner

LEVERAGING ENDPOINT AND NETWORK ENVIRONMENT INFERENCES FOR MALWARE TRAFFIC CLASSIFICATION

TECHNICAL FIELD

The present disclosure relates generally to computer networks, and, more particularly, to leveraging endpoint and network environment inferences for malware traffic classification.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices. However, many instances of malware now use encryption, to conceal their network activity from detection.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
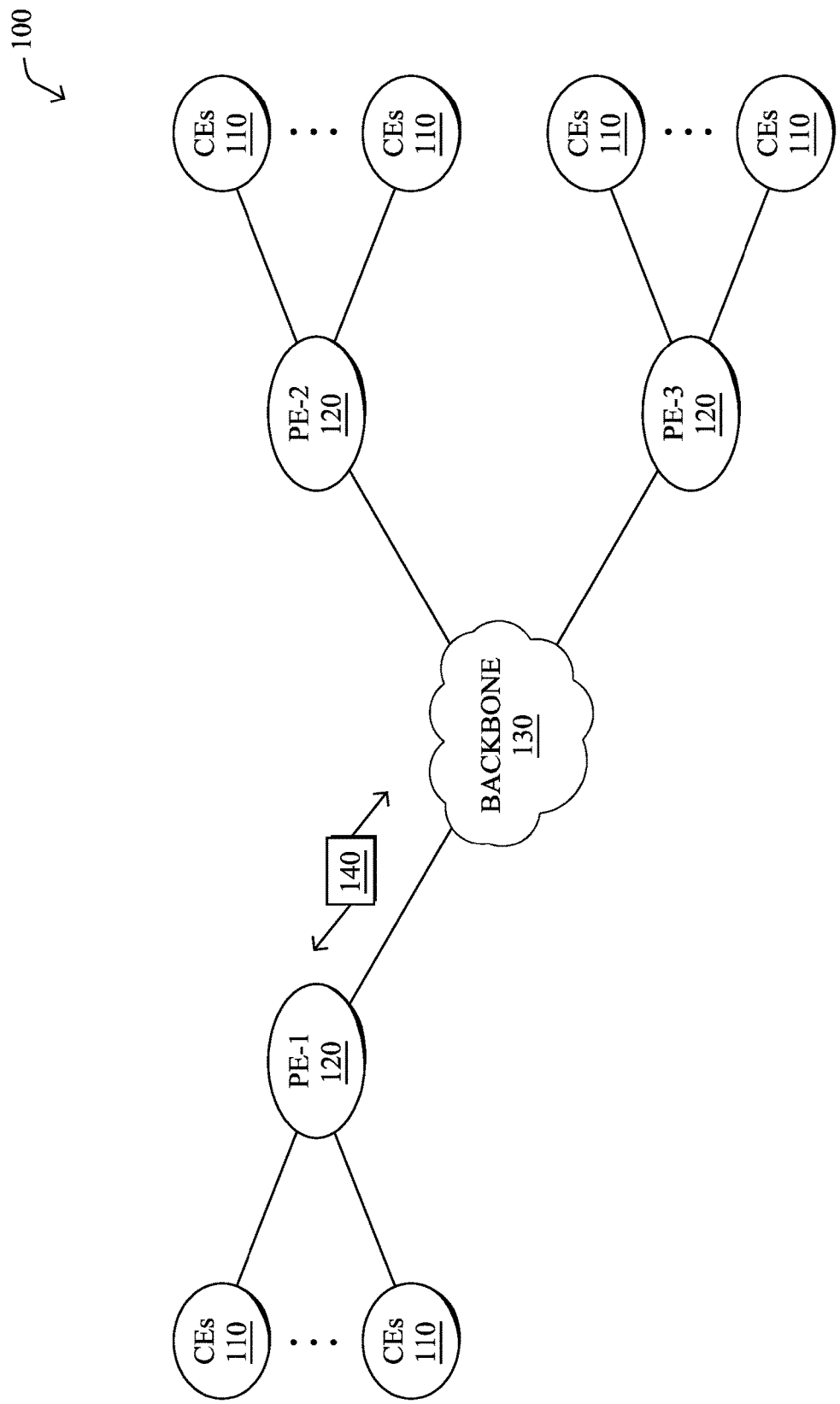
FIGS. 1A-1B illustrate an example communication network.

According to one or more embodiments of the disclosure, a device obtains simulation environment data regarding traffic generated within a simulation environment in which malware is executed. The device trains a malware detector using the simulation environment data. The device obtains deployment environment characteristics of a network to which the malware detector is to be deployed. The device configures the malware detector to ignore data in the simulation environment data that is associated with one or more environment characteristics that are not present in the deployment environment characteristics.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
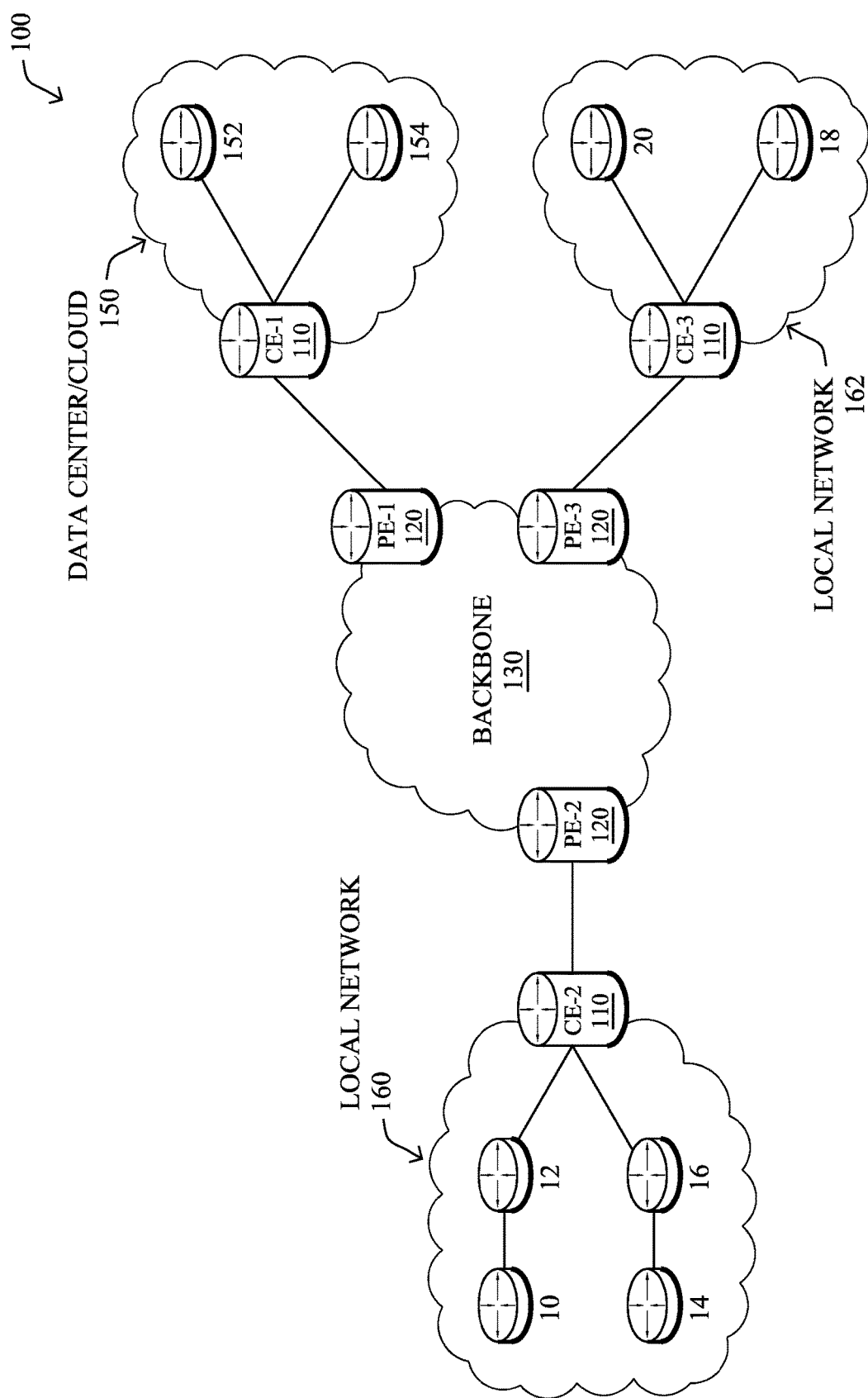

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
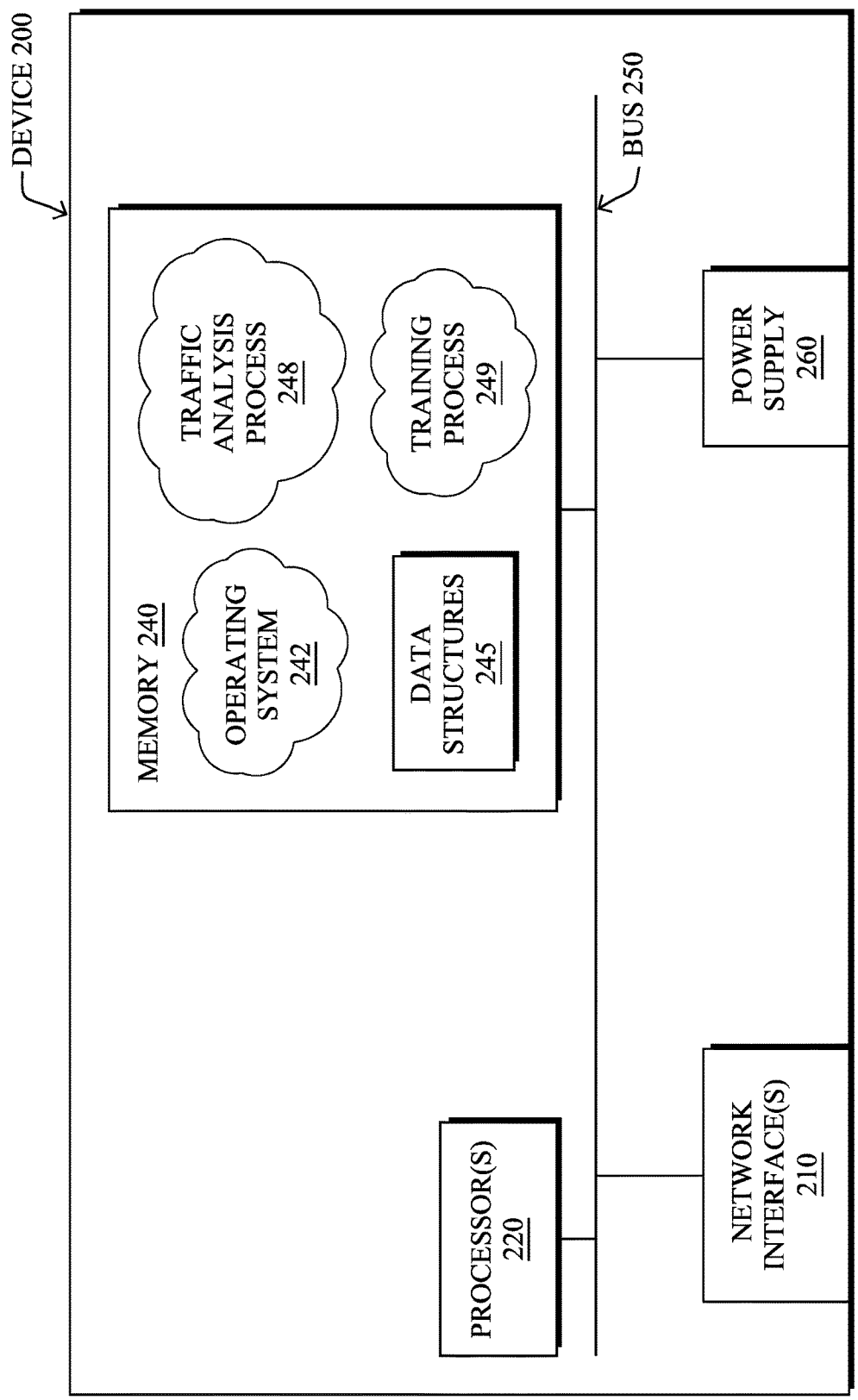
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248 and/or a training process 249.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
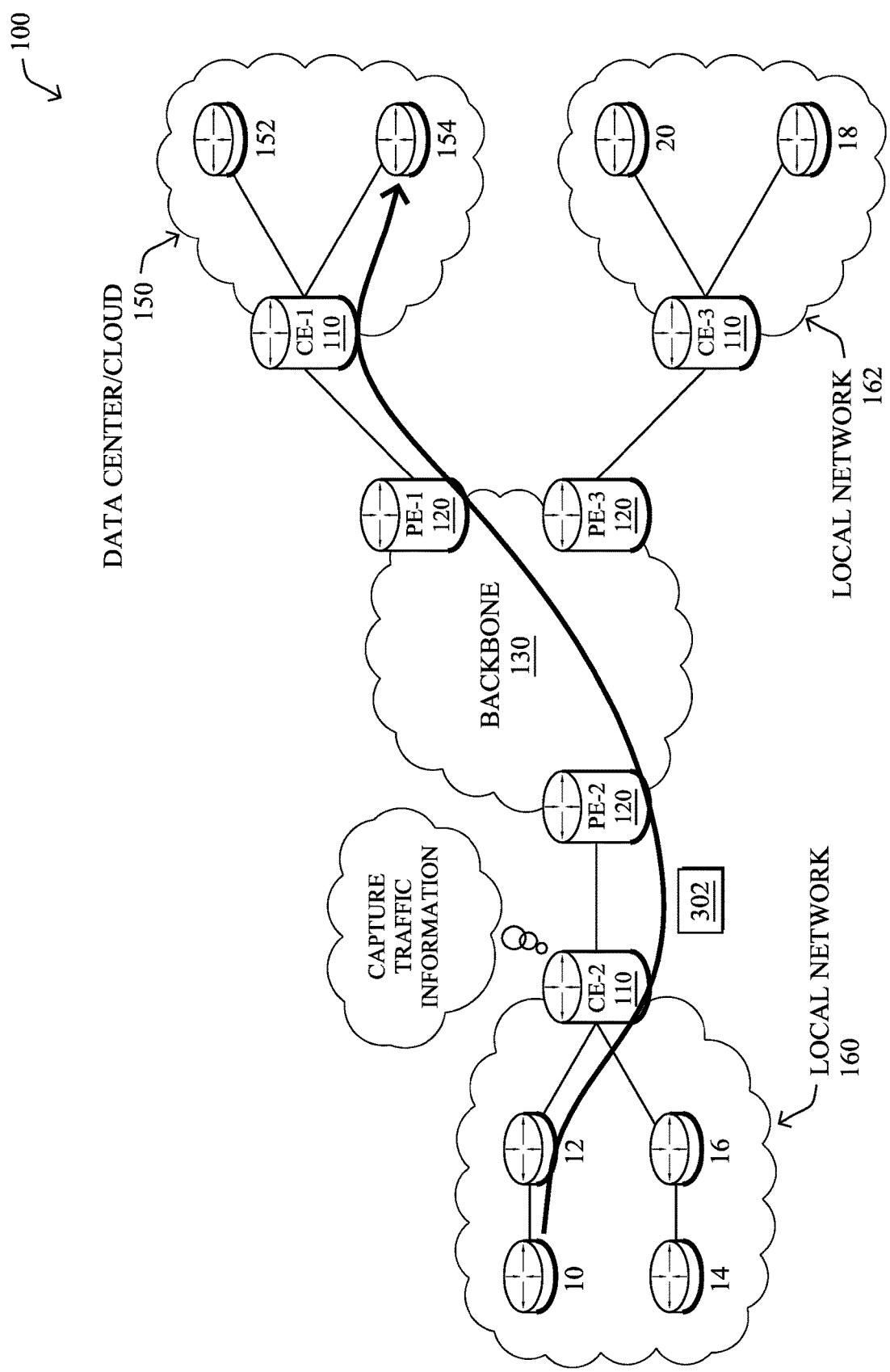
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions, etc., HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, a malware detector can be trained to detect the presence of malware in a network through analysis of the traffic in the network. Typically, it is assumed that such a trained classifier can implicitly infer and generalize many of the idiosyncrasies found in general network traffic. However, this assumption also fails to take into account that any or all of the following environment characteristics can affect the network traffic itself: the endpoint operating system, TLS library in use, recently seen TLS libraries on a given endpoint, application layer protocol, User-Agent in the case of HTTP, current flow and congestion control parameters, round trip time, proxies in place, information about the collection environment, and/or any other environment conditions that may affect the network traffic. In other words, differences in these characteristics from the simulation environment used to gather training data and the deployment environment may affect the performance of the resulting malware detector.

Leveraging Endpoint and Network Environment Inferences for Malware Traffic Classification The techniques herein represent a paradigm shift whereby underlying assumptions about the characteristics of the environment are made explicit during generation of the malware detector. Said differently, the techniques herein allow artifacts of the sandbox or other simulation environment to be removed when training a malware detector.

Specifically, according to one or more embodiments of the disclosure as described in detail below, a device obtains simulation environment data regarding traffic generated within a simulation environment in which malware is executed. The device trains a malware detector using the simulation environment data. The device obtains deployment environment characteristics of a network to which the malware detector is to be deployed. The device configures the malware detector to ignore data in the simulation environment data that is associated with one or more environment characteristics that are not present in the deployment environment characteristics.

Illustratively, the techniques described herein may be performed by hardware, software, and/or firmware, such as in accordance with the training process 249, which may include computer executable instructions executed by the processor 220 (or independent processor of interfaces 210) to perform functions relating to the techniques described herein, such as in conjunction with the traffic analysis process 248.

Operationally, as noted, certain factors can affect network traffic such as, but not limited to, the endpoint operating system, TLS library, recently seen TLS libraries on a given endpoint, application layer protocol, User-Agent in the case of HTTP, current flow and congestion control parameters, round trip time, proxies in place, and information about the collection environment. The proposed techniques make the underlying assumptions about these features explicit in the malware models.

Figure 4:
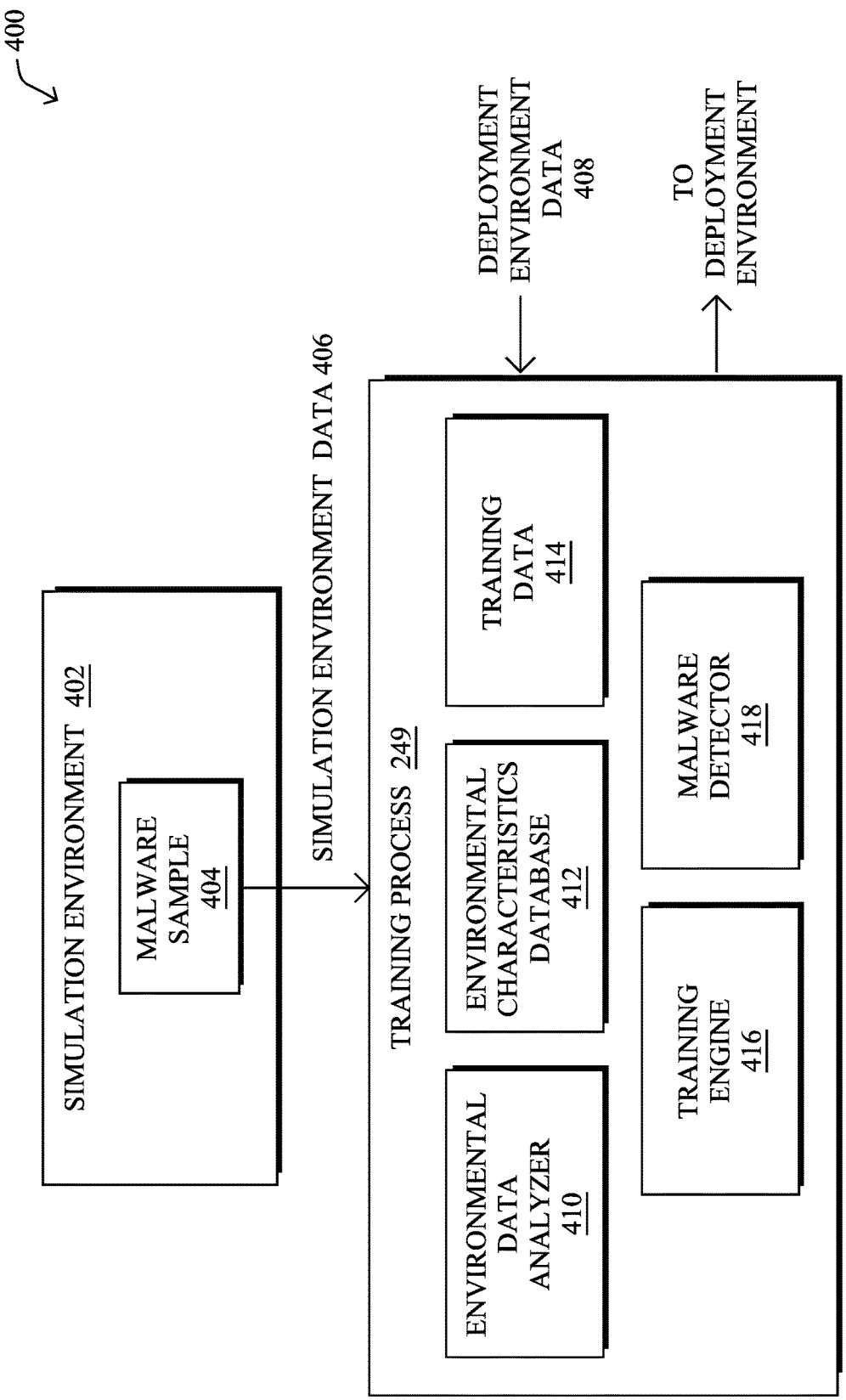
FIG. 4 illustrates an example architecture for training a malware detector.

FIG. 4 illustrates an example architecture 400 for training a malware detector, according to various embodiments. Training process 249 may include any number of sub-processes and/or may access any number of memory locations, such as the components 410-418 shown. As would be appreciated, these sub-processes and/or memory locations may be located on the same device or implemented in a distributed manner across multiple devices, the combination of which may be viewed as a single system/device that executes training process 249. Further, while certain functionalities are described with respect to the sub-processes and memory locations, these functions can be added, removed, or combined as desire, in other implementations.

In many cases, training data for training a malware detector that assesses network traffic may be obtained by executing one or more malware samples and capturing information about the resulting traffic flows. For example, as shown, a malware sample 404 may be executed in a simulation environment 402. In general, simulation environment 402 may be any form of contained or restricted environment, such as a sandbox network. For example, in some cases, malware sample 404 may be executed within a virtual machine (VM), so as not to generate malicious traffic in a user network.

From the execution of malware sample 404 in simulation environment 402, simulation environment data 406 may be captured and provided to training process 249. In various embodiments, simulation environment data 406 may comprise any or all of the following:

Network traffic feature data—this data may include any information that can be captured or derived from the traffic observed in simulation environment 402. For example, the traffic data may include packet size information, header information, timing information, protocol information, application information, or the like.

Environment characteristics—this data may include any information that can be captured or derived about the real or virtual device(s) associated with the observed network traffic in simulation environment 402. For example, this information may indicate the operating system of an endpoint executing malware sample 404, the libraries (e.g., TLS libraries) in use by that endpoint, the application(s) executed by the endpoint, or any other information that can be gathered about the endpoint(s). In further cases, these characteristics may include characteristics that are a function of the network configuration itself (e.g., the presence of proxies that alert the traffic in some way, etc.).

From the simulation environment data 406 obtained by training process 249, environment data analyzer 410 may extract out the indicated environment characteristics from simulation environment data 406 and store them in an environment characteristics database 412. In addition, environment data analyzer 410 may extract out the traffic data from simulation environment data 406 for inclusion in training data 414. Such training data 414 may also be labeled, accordingly, based on whether the corresponding traffic is benign or malicious. For example, some or all of the traffic generated by malware sample 404 may be labeled as malware-generated, for purposes of constructing the set of training data 414. In more complex cases, the type of malware used for malware sample 404 may also be included as a label in training data 414. Such information can be used to construct a malware detector 418 that is able to not only distinguish between benign and malicious traffic, but also assess the specific type of malware that generated the malicious traffic.

Training engine 416 may use training data 414 to train one or more traffic classifiers for use in malware detector 418. Notably, malware detector 418 may comprise one or more machine learning-based classifiers that may assess one or more features of an observed traffic flow or set of traffic flows, to discern whether the traffic is indicative of a malware infection. For example, in the case of an encrypted traffic flow, features such as SPLT information can be used to detect flows that are associated with malware. Once trained, training process 249 can then deploy malware detector 418 to the deployment environment by either executing malware detector 418 on the local device of training process 249 or by sending malware detector 418 to a hosting device in the deployment network.

In various embodiments, training process 249 may also be configured to remove artifacts that were present in simulation environment 402 that are not present in the target environment/network to which malware detector 418 is to be deployed. Said differently, training process 249 may configure malware detector 418 to ignore data in simulation environment data 406 that is associated with one or more environment characteristics that are not present in the deployment environment characteristics. Accordingly, training process 249 may obtain deployment environment data 408 from the target environment (e.g., by requesting such data or receiving it on a push basis).

In general, deployment environment data 408 may include any or all of the types of information highlighted above with respect to simulation environment data 406. For example, deployment environment data 408 may indicate the operating systems, libraries, or the like, in use by the endpoint devices in the target network to which malware detector 418 is to be deployed. Similar to simulation environment data 406, environment data analyzer 410 may analyze the deployment environment data 408, extract out the environment characteristics included therein, and use these characteristics to populate environment characteristics database 412.

By way of example, assume that the network to which malware detector 418 includes a proxy that modifies the HTTP headers of traffic in the network. In such a case, training malware detector 418 using training data 414 from simulation environment 402 to assess HTTP header information may not result in an optimal malware detector for the deployment environment. Thus, training engine 416 may configure the traffic classifier(s) of malware detector 418 to ignore these features during execution in the deployment environment.

In another example, assume that deployment environment data 408 indicates the various characteristics of the endpoint devices in the network to which malware detector 418 is to be deployed. In such a case, training engine 416 may use the training data 414 having associated characteristics in database 412 that match those of the deployment environment. For example, training engine 416 may train one or more traffic classifiers in malware detector 418 for each endpoint device/host type in the deployment network.

In various embodiments, a set of classifiers and/or rules may be used to first identify the environment characteristics. In turn, the outputs of such an assessment may be used to normalize the observed flow features or may be used as input to the other classifiers in malware detector 418. For example, consider the case in which training engine 416 trains a number of classifiers or establishes a number of rules to distinguish between different libraries, operating systems, or other environment characteristics found in simulation environment 402. These classifiers and/or rules can then be deployed to the target environment, to identify the environment characteristics of the deployment environment (e.g., which libraries are used by the hosts in the target network, etc.). In turn, based on the resulting deployment environment data 408, training engine 416 may configure malware detector 418 to ignore any differences in the libraries, operating systems, or the like, between the deployment environment and simulation environment 402.

Training engine 416 may take any number of steps, to configure malware detector 418 to ignore any differences between the characteristics of the deployment environment and of simulation environment 402. For example, training engine 416 may modify training data 414 to remove the differences and train malware detector 418, accordingly. In another example, training engine 416 may select a combination of libraries from simulation environment 402 that would work in the deployment environment and select the appropriate training data 414 with which to train malware detector 418. In yet another case, training engine 416 may simply prevent any classifiers from inclusion in malware detector 418 that were trained based on the libraries, operating systems, etc., that are not in the deployment environment.

In one embodiment, training engine 416 may use transfer learning, to train malware detector 418 to ignore artifacts from simulation environment 402. Generally, transfer learning is a branch of machine learning that entails using knowledge obtained when solving one problem to solve a related problem. For example, a model pre-trained to address one classification problem can be used as the basis for another model that seeks to address a related classification problem.

Figure 5:
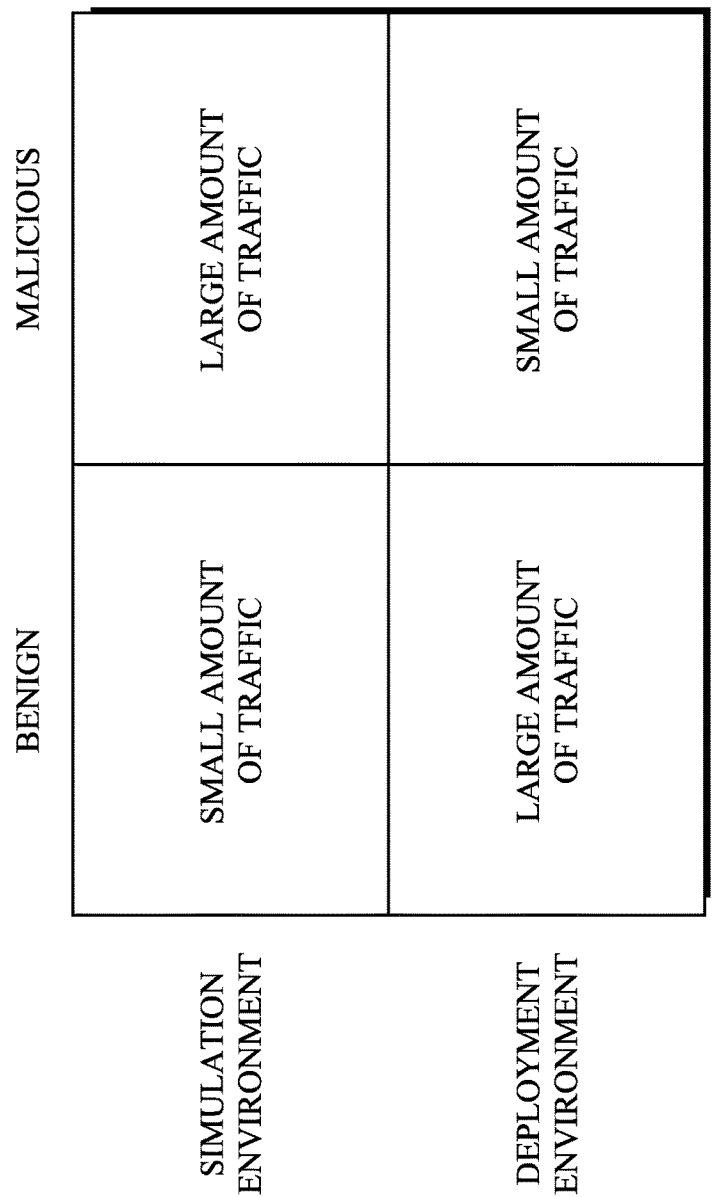
FIG. 5 illustrates an example of traffic volume breakdowns.

FIG. 5 illustrates an example of traffic volume breakdowns, in various embodiments. As shown, there are a number of observations that can be made, when assessing the traffic data captured from a simulation environment and from a deployment environment. Typically, a large amount of malicious traffic will be observed. However, a small amount of benign traffic may also be observed. For example, some malware may attempt to conceal its activities by also generating benign traffic. In the case of a deployment environment, the opposite is often true: there is a large amount of benign traffic, with possibly a much smaller amount of malicious traffic.

According to various embodiments, transfer learning can be used to train a malware detector by first training two different classifiers: 1.) A classifier that distinguishes between benign and malicious traffic, and 2.) a classifier that distinguishes between traffic in the simulation environment and traffic in the deployment environment. In turn, transfer learning can be applied to improve one of these classifiers by leveraging the other classifier. For example, after training the simulation vs. deployment environment classifier, this classifier can be used to improve the benign vs. malicious traffic classifier, in accordance with one or more suitable objective functions. Such an objective function may, e.g., represent an optimization problem that seeks to maximize a convex combination of the accuracies of the two classifiers. In this way, training engine 416 shown in FIG. 4 can train malware detector 418 using the environment data 406 and 408 from both the simulation and deployment environments.

Figure 6:
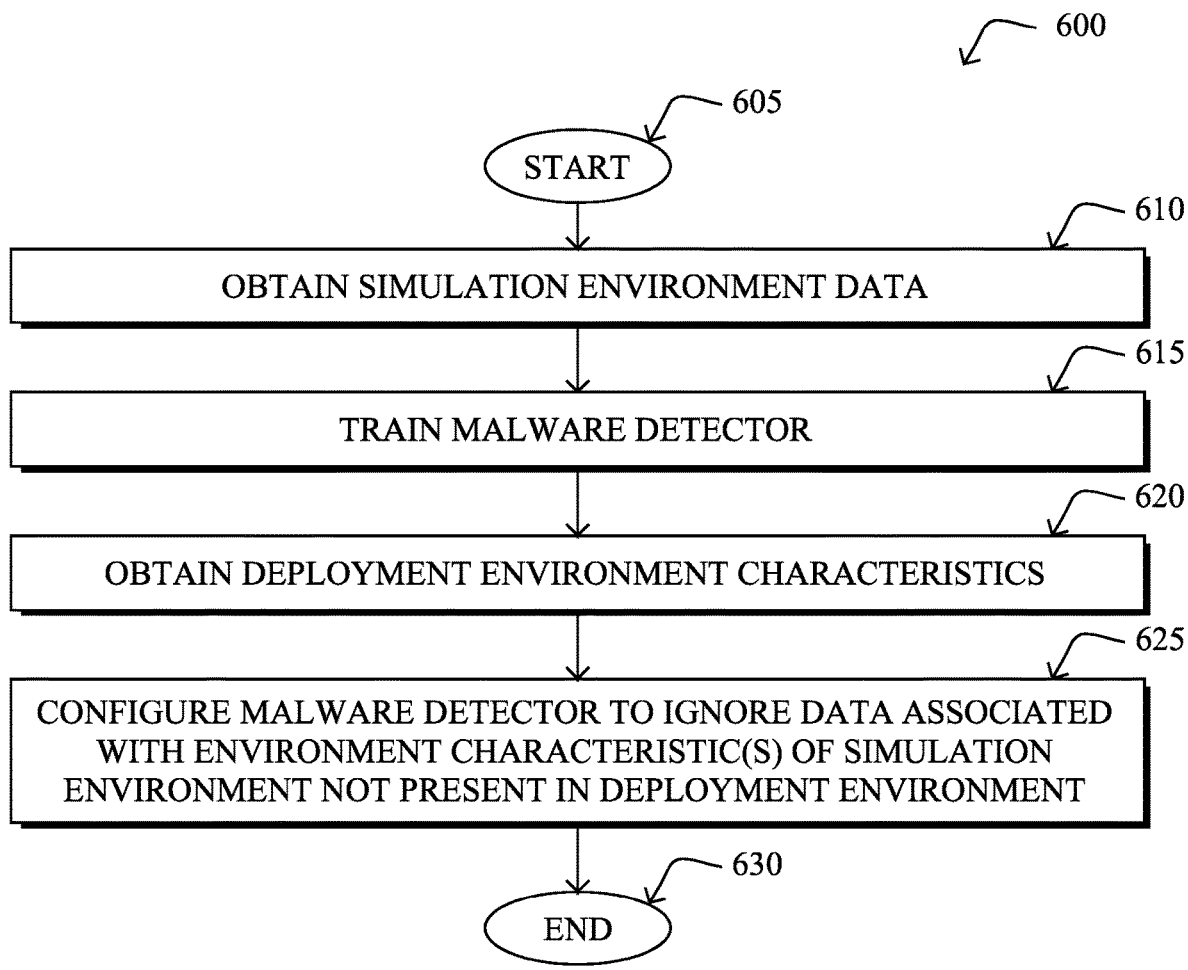
FIG. 6 illustrates an example simplified procedure for training a malware detector.

FIG. 6 illustrates an example simplified procedure for training a malware detector in a network in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may obtain simulation environment data regarding traffic generated within a simulation environment in which malware is executed. For example, one or more malware samples may be executed in a simulation environment, such as one or more virtual machines, and the resulting traffic data collected. In addition to the traffic data, the simulation environment data may indicate the environment characteristics of the simulation environment such as, but not limited to, the operating system(s) that were used, the (TLS) libraries that were used, application layer protocol(s) used, HTTP user agent information, flow and congestion control parameters, round trip time, proxies in place, and/or any other information about the collection environment. Note that some or all of this information may be inferred directly from the captured traffic information or indicated separately.

At step 615, as detailed above, the device may train a malware detector using the simulation environment data. For example, the simulation environment data may be labeled as benign or malicious and the device may train one or more machine learning-based traffic classifiers, to distinguish between malicious and benign traffic.

At step 620, the device may obtain deployment environment characteristics of a network to which the malware detector is to be deployed, as described in greater detail above. These environment characteristics may be the same type of characteristics obtained in step 610, such as the operating systems, libraries, etc., that are in use in the deployment environment/network. In some embodiments, the obtained deployment environment characteristics may be inferred from traffic data captured in the deployment environment.

At step 625, as detailed above, the device may configure the malware detector to ignore data in the simulation environment data that is associated with one or more environment characteristics that are not present in the deployment environment characteristics. In particular, the device may configure the malware detector to ignore those environment characteristics/artifacts from the sandbox environment that are not actually found in the deployment environment. More specifically, the detector may ignore the data associated with the simulation environment by filtering out statistical patterns or artifacts that are generated by the simulated environment and not by the malware. For example, the device may exclude such data from inclusion in the training data with which the malware detector is trained, tailor the malware detector to the specific combination of characteristics for the hosts in the deployment network, or the like. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the training of a more accurate malware detector by removing artifacts from the simulation environment from consideration by the malware detector during deployment.

While there have been shown and described illustrative embodiments that provide for leveraging endpoint and network environment inferences for malware traffic classification, it is to be understood that various other adaptations and modifications may be made within the spirit and scope of the embodiments herein. For example, while certain embodiments are described herein with respect to using certain models for purposes of malware detection, the models are not limited as such and may be used for other functions, in other embodiments. In addition, while certain protocols are shown, such as HTTP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
obtaining, by a device, simulation environment data regarding traffic generated within a simulation environment in which malware is executed;
training, by the device, a malware detector using the simulation environment data;
obtaining, by the device, deployment environment characteristics of a network to which the malware detector is to be deployed;
training, by the device, a first machine learning-based classifier to distinguish between traffic in the simulation environment in which malware is executed and traffic in a deployment environment in which the malware detector is to be deployed; and configuring, by the device, the malware detector to ignore data in the simulation environment data that is associated with one or more environment characteristics that are not present in the deployment environment characteristics using the trained first machine learning-based classifier.

2. The method as in claim 1, wherein the one or more environment characteristics comprise at least one of: an endpoint operating system, a Transport Layer Security (TLS) library, or a Hypertext Transfer Protocol (HTTP) User-Agent.

3. The method as in claim 1, wherein the one or more environment characteristics comprise at least one of: an application layer protocol, a flow or congestion control parameter, or a network proxy.

4. The method as in claim 1, wherein the traffic generated within a simulation environment comprises encrypted traffic.

5. The method as in claim 1, wherein configuring the malware detector to ignore data in the simulation environment data that is associated with the one or more environment characteristics that are not present in the deployment environment characteristics comprises:
training, by the device, a second machine learning-based classifier to distinguish between malicious and benign traffic, using the simulation environment data and deployment environment data regarding traffic generated within the network to which the malware detector is to be deployed; and
using, by the device, transfer learning, to train the malware detector based on the trained first and second machine learning-based classifiers.

6. The method as in claim 1, wherein training the malware detector using the simulation environment data comprises:
training, by the device, a plurality of traffic classifiers for different combinations of environment characteristics of the simulation environment; and wherein configuring the malware detector to ignore data in the simulation environment data that is associated with the one or more environment characteristics that are not present in the deployment environment characteristics comprises:
using, by the device, the traffic classifiers to identify and prevent a portion of the simulation environment data from use as training data for the malware detector.

7. The method as in claim 1, wherein configuring the malware detector to ignore data in the simulation environment data that is associated with one or more environment characteristics that are not present in the deployment environment characteristics comprises:
configuring, by the device, the malware detector to identify the one or more environment characteristics using one or more rules or traffic classifiers.

8. The method as in claim 1, wherein the malware detector ignores the data associated with the simulation environment by filtering out statistical patterns or artifacts that are generated by the simulation environment and not by the malware.

9. An apparatus, comprising:
one or more network interfaces to communicate with a network;
a processor coupled to the network interfaces and configured to execute one or more processes; and
a memory configured to store a process executable by the processor, the process when executed configured to:
obtain simulation environment data regarding traffic generated within a simulation environment in which malware is executed;
train a malware detector using the simulation environment data;
obtain deployment environment characteristics of a network to which the malware detector is to be deployed;
train a first machine learning-based classifier to distinguish between traffic in the simulation environment in which malware is executed and traffic in a deployment environment in which the malware detector is to be deployed; and
configure the malware detector to ignore data in the simulation environment data that is associated with one or more environment characteristics that are not present in the deployment environment characteristics using the trained first machine learning-based classifier.

10. The apparatus as in claim 9, wherein the one or more environment characteristics comprise at least one of: an endpoint operating system, a Transport Layer Security (TLS) library, or a Hypertext Transfer Protocol (HTTP) User-Agent.

11. The apparatus as in claim 9, wherein the one or more environment characteristics comprise at least one of: an application layer protocol, a flow or congestion control parameter, or a network proxy.

12. The apparatus as in claim 9, wherein the traffic generated within a simulation environment comprises encrypted traffic.

13. The apparatus as in claim 9, wherein the apparatus configures the malware detector to ignore data in the simulation environment data that is associated with the one or more environment characteristics that are not present in the deployment environment characteristics by:
training a second machine learning-based classifier to distinguish between malicious and benign traffic, using the simulation environment data and deployment environment data regarding traffic generated within the network to which the malware detector is to be deployed; and
using transfer learning, to train the malware detector based on the trained first and second machine learning-based classifiers.

14. The apparatus as in claim 9, wherein the apparatus trains the malware detector using the simulation environment data by:
training a plurality of traffic classifiers for different combinations of environment characteristics of the simulation environment; and wherein configuring the malware detector to ignore data in the simulation environment data that is associated with the one or more environment characteristics that are not present in the deployment environment characteristics comprises:
using the traffic classifiers to identify and prevent a portion of the simulation environment data from use as training data for the malware detector.

15. The apparatus as in claim 9, wherein the apparatus configures the malware detector to ignore data in the simulation environment data that is associated with one or more environment characteristics that are not present in the deployment environment characteristics by:
configuring the malware detector to identify the one or more environment characteristics using one or more rules or traffic classifiers.

16. The apparatus as in claim 9, wherein the process when executed is further configured to:
execute the malware in the simulation environment within a virtual machine.

17. The apparatus as in claim 9, wherein the process when executed is further configured to:
 deploy the malware detector to the network to which the malware detector is to be deployed.

18. A tangible, non-transitory, computer-readable medium storing program instructions that cause a device to execute a process comprising:
 obtaining, by the device, simulation environment data regarding traffic generated within a simulation environment in which malware is executed;
 training, by the device, a malware detector using the simulation environment data;
 obtaining, by the device, deployment environment characteristics of a network to which the malware detector is to be deployed;
 training, by the device, a first machine learning-based classifier to distinguish between traffic in the simulation environment in which malware is executed and traffic in a deployment environment in which the malware detector is to be deployed; and
 configuring, by the device, the malware detector to ignore data in the simulation environment data that is associated with one or more environment characteristics that are not present in the deployment environment characteristics using the trained first machine learning-based classifier.

19. The computer-readable medium as in claim 18, wherein the one or more environment characteristics comprise at least one of: an endpoint operating system, a Transport Layer Security (TLS) library, a Hypertext Transfer Protocol (HTTP) User-Agent, an application layer protocol, a flow or congestion control parameter, or a network proxy.

20. The computer-readable medium as in claim 18, wherein configuring the malware detector to ignore data in the simulation environment data that is associated with the one or more environment characteristics that are not present in the deployment environment characteristics comprises:
 training, by the device, a second machine learning-based classifier to distinguish between malicious and benign traffic, using the simulation environment data and deployment environment data regarding traffic generated within the network to which the malware detector is to be deployed; and
 using, by the device, transfer learning, to train the malware detector based on the trained first and second machine learning-based classifiers.

\* \* \* \* \*